United States Patent [19]

Nannini

[11] Patent Number: 4,606,621

[45] Date of Patent: Aug. 19, 1986

[54] DEVICE FOR REGULATING THE INCLINATION OF THE INDIVIDUAL RODS WITH RESPECT TO THE FRONT PART OF A GLASSES FRAME

[76] Inventor: Giorgio Nannini, via Grandi 153, Modena, Italy

[21] Appl. No.: 650,294

[22] Filed: Sep. 12, 1984

[51] Int. Cl.[4] .......................... G02C 5/20; G02C 5/14
[52] U.S. Cl. .................................... 351/115; 351/119; 351/120
[58] Field of Search ........................ 351/115, 119, 120

[56] References Cited

U.S. PATENT DOCUMENTS 3,271,094  9/1966  Wildermuth ........................ 351/120

Primary Examiner—Rodney B. Bovernick
Attorney, Agent, or Firm—Karl F. Ross; Herbert Dubno

[57] ABSTRACT

A device for adjusting the inclination of a temple rod with respect to the front part of an eyeglass frame comprises a hinge element by which the temple rod is articulated to the front part of the frame which has an elongated cavity facing the inner surface of the rod upon which a pair of frustoconical pins is mounted to project into the cavity. One of the pins is based upon a seat formed by the hinge element while the other pin is engaged by a pair of screws which adjust the angle of inclination as one or the other is backed out and the remaining screw advanced.

4 Claims, 4 Drawing Figures

DEVICE FOR REGULATING THE INCLINATION OF THE INDIVIDUAL RODS WITH RESPECT TO THE FRONT PART OF A GLASSES FRAME

FIELD OF THE INVENTION

The invention relates a device for regulating the inclination of the individual temples with respect to the front part of an eyeglass frame.

It is specifically, but not exclusively, suitable for being used with frames and rods of plastic or of metallic materials, mostly in the form of thin sections.

The invention gives the possibility of adjusting the glasses frame to the face conformation, so that the front part and the lenses are arranged in the right position in front of the eyes.

BACKGROUND OF THE INVENTION

There are devices known which allow the regulation of the inclination of the front part of an eyeglass frame with respect to the individual rods or temples, and hence with respect to the hinge axes.

Such devices are, however, rather complicated and in any case can be employed almost only on rather heavy types of frames.

OBJECTS OF THE INVENTION

It is object of the present invention to provide an improved device for regulating the inclination of an individual rod or temple with respect to the front part of an eyeglass frame which is of simple construction and comparatively limited in overall dimensions.

Another object is to provide a device for the purpose described which can be applied to frames and to thin rods generally made of metallic materials, without aesthetically "weighing down" the frames and the rods themselves.

SUMMARY OF THE INVENTION

This and other objects of the invention that will better appear afterwards are obtained by a device for regulating the inclination of the individual rods or temples with respect to the front part of eyeglass frames, comprising:

a hinge element pivoted to the said front part and capable of rotating around an axis, fixed with respect to the front part, provided with a cavity of elongated form, receiving two truncated cone (frustoconical) projecting pins, fixed with a short mutual spacing in the inner side of the individual rod with axes parallel and perpendicular to the rod itself; at least the first of these two pins should be connectable in contact, with a part of its truncated cone lateral surface, with a corresponding connection seating in the said cavity, so that the axis of the said pin is almost perpendicular to the hinge axis; the second pin is devised to be housed, with a certain play, inside the said hollow seating, and to be positioned with respect to it through the combined action of two parallel locking and adjusting screws, moving in clearance threaded holes provided for in the said hinge element and acting, by means of their ends, on two points of the truncated cone lateral surface of the said second pin, placed on the opposite sides with respect to the common plane, containing the axes of the said first and second pin.

BRIEF DESCRIPTION OF THE DRAWING

The above and other objects, features and advantages of the invention will become more readily apparent from the following description, reference being made to the accompanying drawing, in which.

SPECIFIC DESCRIPTION

Figure 1:
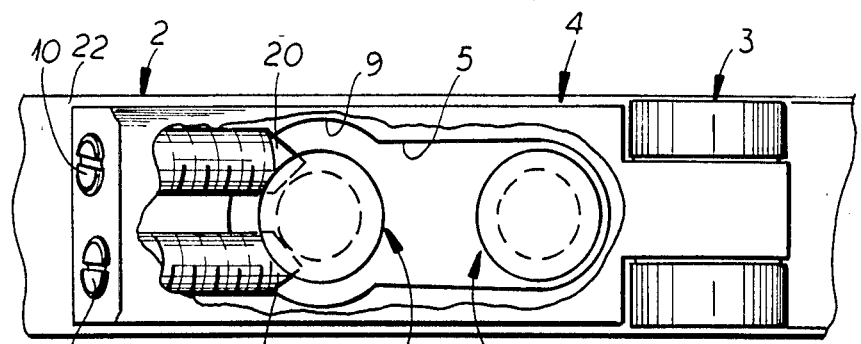
FIG. 1 is a front view in vertical elevation, partially in cross section.

To the sides of the front part 1 of an eyeglass frame, two rods 2 are hinged. The rods 2 are made of a metal alloy and are rather thin. Each of the rods 2 has its inclination adjustable with respect to the front part 1, since it can be rotated around an axis almost normal to the axis of the hinge 3, through which the rod is hinged to the front 1. The regulation of the inclination of the individual rod 2 with respect to the front part 1 is made possible by a device which includes a special hinge element generally represented at 4. The hinge element 4 is pivoted to the front part 1 around the fixed axis of the hinge 3 and is provided with a cavity of elongated form 5.

This cavity houses two truncated cone (frustoconical) projecting pins 6 and 7 fastened at a short mutual distance upon the inner side 22 of the individual rod 2 with axes which are parallel but which are perpendicular to the rod itself. The pins 6 and 7 are identical and are provided with feet 16 and 17 by means of which they integrally adhere to the inner side 22 of the rod 2.

The truncated cone pin 6 is in contact, with a part of its own frustoconical lateral surface, with a corresponding concave seat having the form of a half truncated cone 8 formed at the end of the elongated form cavity 5 closest to the hinge 3. At the end opposite to the one having the connecting seating 8, the elongated cavity 5 has an enlargement 9 housing the truncated cone pin 7, with play in the direction perpendicular to the cavity axis 5.

The play of the pin 7 inside the enlargement 9 of the cavity 5 allows little reciprocal rotations of the rod 2 with respect to the hinge element 4 around the pin axis 6. The pin 7 can be positioned inside the cavity 5 in a transverse direction with respect to it, by means of the combined action of two parallel adjusting and locking screws 10 and 11, moving in clearance threaded holes provided for at the end of the hinge element 4 opposite to the one with the hinge 3.

The screws 10 and 11 are oriented and placed at a mutual distance (spacing) allowing them to interact, by means of their pointed ends 20 and 21, with two areas of the frustoconical lateral surface of the pin 7, at two opposite sides with respect to a common plane containing the axes of the pin 7 and of the pin 6. The position of the pin 7 with respect to the cavity 5, and hence the inclination of the rod 2 with respect to the hinge element 4, depends upon the different axial position taken by the two screws 10 and 11. As a matter of fact, with reference to FIG. 1, to have the rod 2 slightly rotate clockwise with respect to the hinge element 4, it is sufficient to retract the pointed end 20 of the screw 10 by unscrewing the screw 10 itself, then advance the pointed end 21 of the screw 11.

The locking of the rod 2 on the hinge element 4 is automatically obtained when both the pointed ends 20 and 21 press against the two opposing points of the truncated cone surface of the pin 7.

Figure 2:
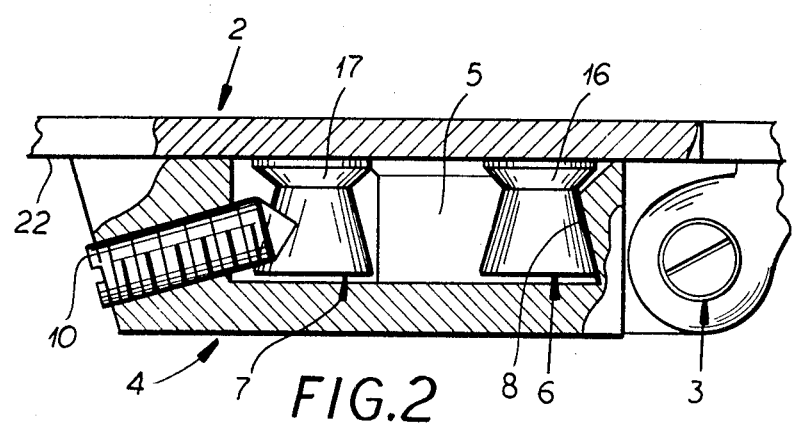
FIG. 2 is a lateral view, partially in cross section, of FIG. 1.
Figures 3, 4:
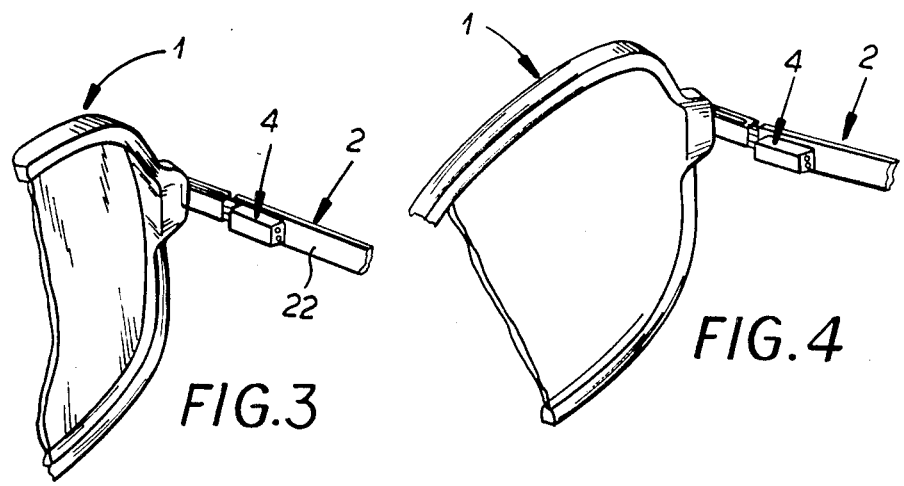
FIGS. 3 and 4 are, in reduced scale, two views in perspective concerning two different configuration of the invention.

The screws 10 and 11, by pressing with their ends 20 and 21 against two separate areas of the truncated cone surface of the pin 7, allow the locking of the rod 2 to the hinge element 4. Such a situation is illustrated clearly in FIG. 2, from which it is evident that the thrust exterted by the screws 10 and 11 on the truncated cone surface of the pin 7 brings about the approach and the clamping of the hinge element 4 against the inner side 22 of the rod 2. As a mattter of fact, the truncated cone pins 6 and 7 have circular sections which decrease in diameter while proceding from the free ends towards the feet 16 and 17. Besides, the connection seat 8 is hollow and has the form of a half truncated cone which has the same taper as the corresponding truncated cone outer surface of the pin 6 to which it is in contact.

I claim:

1. A device for regulating the inclination of individual temple rods with respect to a front part of an eyeglass frame, said device comprising:

a hinge element pivoted to said front part of said eyeglass frame and capable of rotating around a hinge axis fixed with respect to said eyeglass frame and provided with a cavity of elongated form;

a first truncated cone projecting pin disposed within said cavity and connecting over a part of a truncated cone lateral outer surface a complementary connection seat formed in said cavity, said first pin having an axis substantially perpendicular to the hinge axis; and a second truncated cone projecting pin disposed within an enlargement of said cavity with play, said second pin having an axis and being positioned with respect to said cavity through the combined action of two parallel adjusting and locking screws moving in respective clearance threaded holes formed in the said hinge element and acting by means of respective ends, on two parts of a truncated cone lateral surface of said second pin on opposite sides of a common plane containing the axes of said first and second pins.

2. The device defined in claim 1 wherein said first and second pins are substantially identical and are each provided with a connection foot through which said pins are fastened to an inner side of the individual rod, so as to have a circular section which decreases in diameter while proceeding from a free end of each pin to the respective foot.

3. The device defined in claim 1 wherein said connection seat is formed at one end of the said cavity, is concave and has the form of a half truncated cone which has substantially the same taper as the corresponding truncated cone outer surface of the said first pin with which it is in contact.

4. The device defined in claim 1 wherein said first and second pins are each formed with two truncated cone sections, of which one with a larger diameter is arranged at the free end of the pin.

* * * * *